United States Patent Office 2,814,849
Patented Dec. 3, 1957

2,814,849

PROCESS OF PRODUCING REFRACTORY URANIUM OXIDE ARTICLES

Noble E. Hamilton, Ames, Iowa, assignor to the United States of America as represented by the United States Atomic Energy Commission No Drawing. Application June 27, 1947, Serial No. 757,690

5 Claims. (Cl. 25—156)

The present invention is concerned with a refractory composition of uranium oxide and a new and novel method of fabricating uranium oxide into a shaped refractory mass.

An object of the present invention is to provide a method for fabricating uranium oxide into a shaped refractory article.

It is a further object of this invention to prepare a uranium oxide refractory mass by reacting uranium oxide with a uranium halide at an elevated temperature.

Further objects of the present invention will be apparent from the following description.

In making metal fusions of uranium metal, which has a melting point of about 1125° C., it is necessary to have a refractory container of unusual stability so that it will retain its form and there will be little or no reaction or alloying between the molten uranium metal and the refractory. Uranium oxide, when shaped into a refractory article, affords a container which introduces practically no contamination other than oxygen when sintered in a non-oxidizing atmosphere, such as hydrogen gas. When uranium oxide is compressed into a shaped mass and sintered at an elevated temperature, uranium oxide in itself does not have sufficient cohesion to form a refractory article having sufficient mechanical strength and resistance to thermal shock at elevated temperatures from about 1100° C. to about 2000° C. In addition, the results obtained from admixing uranium oxide and uranium metal, pressing said composition into a shaped mass and then firing showed that poorly sintered and porous articles were produced, sometimes accompanied by swelling and distortion.

The present invention is directed toward a method of fabricating uranium oxide into a shaped refractory article for making metal fusions of uranium metal by introducing a uranium halide fluxing reagent into a uranium oxide and then mixing and compressing the materials into a shaped composite mass. The shaped composite mass of uranium oxide and uranium halide is then fired at an elevated temperature so as to form a refractory sintered article. It was found in the present invention that the introduction of a uranium halide fluxing agent afforded a fluxing action with the uranium oxide particles and that excellent cohesion between these oxide particles was obtained.

In accordance with this invention, a shaped refractory article of uranium dioxide was made in the following manner. Chemically pure uranium dioxide was ground in a conventional manner to a mesh of about 325 or finer and admixed with a uranium halide, preferably uranium tetrafluoride. The mixture of uranium dioxide and uranium tetrafluoride was then ground and dry-pressed into a shaped mass, for instance, in a crucible. It was found that approximately 90 percent of uranium dioxide and 10 percent of uranium tetrafluoride represented a preferred composition.

The shaped mass of uranium dioxide and uranium tetrafluoride was then placed in a sintering furnace having a controlled atmosphere. In the present instance, an atmosphere of hydrogen gas was used and this non-oxidizing atmosphere provided the most satisfactory uranium oxide refractory bodies. The temperature of the sintering furnace was slowly brought up to a preferred temperature of about 1800° C., although satisfactory results were obtained over a temperature range from about 1600° C. to 2100° C. The firing time cycle approximated 40 minutes. The uranium dioxide crucibles produced in this manner showed no signs of distortion, were fairly well sintered, and had smooth, dark-grey surfaces. It shall be noted that the higher oxide of uranium may be used in a similar manner, although uranium dioxide was found to be the preferred oxide.

Another embodiment of this invention provides a method of bonding a uranium oxide to a surface of another refractory material, such as beryllium oxide. In order to fabricate a bonded composite shaped mass of uranium oxide and beryllium oxide, a uranium oxide crucible was first molded with approximately 10 percent by weight of uranium tetrafluoride. The uranium oxide-uranium tetrafluoride crucible was baked in a hydrogen atmosphere at about 1800° C. and then placed contiguously with the inner surface of a beryllium-oxide-lined aluminum oxide crucible. When uranium metal was melted in this uranium oxide crucible and held at a temperature of about 1800° C., as was shown by an X-ray defraction pattern, uranium oxide was deposited on the beryllium oxide lining. It was noted that when a uranium oxide crucible was placed in juxtaposition with a beryllium oxide liner and the uranium oxide crucible did not contain uranium metal halide, a slight amount of uranium oxide was deposited on the beryllium liner, indicating that the source of uranium oxide was the uranium oxide crucible itself, but that the bond between the uranium oxide and beryllium oxide surfaces was not continuous, thereby affording little mechanical strength to the uranium oxide crucible.

This method of fabrication utilizing a uranium halide flux, such as uranium tetrafluoride, affords a means of depositing uranium oxide on the surface of another refractory oxide surface which affords greater mechanical strength to the uranium oxide crucible. In this manner, a high-purity melt of uranium may be obtained since the only contaminant in contact with the pure uranium metal would be oxygen; therefore, this method of bonding uranium oxide to another refractory oxide, such as beryllium oxide, affords a convenient means of making refractories for pure-uranium-metal fusions.

Although uranium tetrafluoride was used as the preferred fluxing reagent, other uranium tetrahalides, such as uranium tetrachloride, may be used in a similar manner.

It will be apparent to those skilled in the art that various modifications can be made without departing from the principles of the invention as disclosed herein, and for this reason it is not intended that this invention shall be limited other than by the scope of the appended claims.

What is claimed is:

1. A method of producing a shaped sintered refractory mass which comprises admixing and compressing uranium dioxide and uranium tetrafluoride into a shaped article, and then heating said shaped article at an elevated temperature in a non-oxidizing atmosphere.

2. A method of producing a shaped sintered refractory mass which comprises admixing and compressing about 90 percent by weight of uranium dioxide and about 10 percent by weight of uranium tetrafluoride into a shaped article, and then heating said shaped article to a temperature of about 1800° C. in a hydrogen atmosphere.

3. A method of producing a shaped composite refractory article which comprises admixing and compressing uranium dioxide and a uranium tetrahalide fluxing reagent into a shaped mass, placing said mass contiguous with the surface of a beryllium oxide refrectory article, said surface conforming to the shape of said mass, heating said composite article to a sintering temperature in a non-oxidizing atmosphere so as to effect the deposition of uranium dioxide on the beryllium oxide surface.

4. A method of producing a shaped composite refractory article which comprises admixing and compressing about 90 percent by weight of uranium dioxide and about 10 percent by weight of uranium tetrafluoride into a shaped mass, placing said mass contiguous with the surface of a beryllium oxide refractory article, said surface conforming to the shape of said mass, heating said composite article to a temperature in the range between 1400° C. and 1900° C. in an atmosphere of hydrogen gas so as to effect the deposition of uranium oxide on the beryllium oxide surface.

5. A method of bonding a refractory uranium oxide surface to a refractory beryllium oxide surface which comprises admixing about 90 percent by weight of uranium dioxide and about 10 percent by weight of uranium tetrafluoride into a shaped mass, placing said mass in juxtaposition with the surface of a shaped beryllium oxide refractory article, heating said composite article to a temperature in the range between 1400° C. and 1900° C. in an atmosphere of hydrogen gas so as to effect a bond between the uranium dioxide surface and the beryllium oxide surface.

References Cited in the file of this patent
FOREIGN PATENTS 282,795    Great Britain _____ 1928